(12) United States Patent
Wu et al.

(10) Patent No.: US 12,736,400 B2
(45) Date of Patent: Sep. 15, 2026

(54) LASER DETECTOR CAPABLE OF DETECTING A LASER SIGNAL ACCORDING TO A TRANSIENT VOLTAGE FLUCTUATION

(71) Applicant: UNITED MICROELECTRONICS CORP., Hsin-Chu City (TW)

(72) Inventors: Kun-Yuan Wu, Kaohsiung City (TW); Chen-Hsien Hsu, Hsinchu County (TW); Wei-Jen Wang, Tainan City (TW); Chien-Fu Chen, Miaoli County (TW); Ruei-Yau Chen, Pingtung County (TW); Cheng-Yang Tsai, Tainan City (TW)

(73) Assignee: UNITED MICROELECTRONICS CORP., Hsin-Chu City (TW)

( * ) Notice: Subject to any disclaimer, the term of this patent is extended or adjusted under 35 U.S.C. 154(b) by 115 days.

(21) Appl. No.: 18/628,814

(22) Filed: Apr. 8, 2024

(65) Prior Publication Data

US 2025/0277695 A1 Sep. 4, 2025

(30) Foreign Application Priority Data

Mar. 1, 2024 (TW) ................................ 113107501

(51) Int. Cl.
*G01J 1/44* (2006.01)
*G06F 21/71* (2013.01)
*G06F 21/75* (2013.01)
*H04L 9/00* (2022.01)
*H10W 42/40* (2026.01)

(52) U.S. Cl.
CPC ................ *G01J 1/44* (2013.01); *G06F 21/71* (2013.01); *G01J 2001/4473* (2013.01); *G06F 21/755* (2017.08); *H04L 9/004* (2013.01); *H10W 42/405* (2026.01)

(58) Field of Classification Search
CPC ..... G01J 1/44; G01J 2001/4473; G06F 21/71; G06F 21/755; H01L 23/576
See application file for complete search history.

(56) References Cited

U.S. PATENT DOCUMENTS 8,242,823 B2 8/2012 Le
2008/0059741 A1* 3/2008 Croguennec ............ G11C 7/24 711/163
2020/0303325 A1* 9/2020 Lewis .................. H10F 39/103
2020/0373302 A1* 11/2020 Onuki ................. H10D 86/423
2023/0125324 A1* 4/2023 Sato .................... H10D 86/441 345/55

* cited by examiner

*Primary Examiner* — Monica T Taba
(74) *Attorney, Agent, or Firm* — Winston Hsu

(57) ABSTRACT

A laser detector includes a delay chain circuit and a warning circuit. The warning circuit is coupled to the delay chain circuit for generating a warning signal. The delay chain circuit includes N inverters coupled in series, an input terminal configured to receive an input voltage to the N inverters, and an output terminal configured to output an output voltage generated by the N inverters. N is a positive integer.

18 Claims, 12 Drawing Sheets

LASER DETECTOR CAPABLE OF DETECTING A LASER SIGNAL ACCORDING TO A TRANSIENT VOLTAGE FLUCTUATION

BACKGROUND OF THE INVENTION

1. Field of the Invention

The present invention discloses a laser detector, and more particularly, a laser detector capable of detecting a laser signal according to a transient voltage fluctuation generated by a laser signal interference of a delay chain circuit.

2. Description of the Prior Art

With rapid technology improvement, various secure and encrypted methods or electronic devices are widely used in different systems, such as phone passcodes, fingerprint recognition locks, and facial recognition locks. For security or authentication systems, when they are attacked by a laser signal or a high-energy pulse (such as the malicious exposure attack or the malicious interference), internal electronic components may malfunction. For example, when an inverter including metal-oxide-semiconductor field-effect transistors is attacked by the laser signal, a transient photoelectric current is generated at its P-N junction. Therefore, the inverter may output unexpected logic levels or unexpected error voltages. As a result, security or authentication mechanisms of the electronic devices may be cracked. For example, the security or authentication mechanisms may be cracked by skipping some essential verification steps, or may be forcibly initialized.

In other words, when security or authentication systems are attacked by the laser signal, since the security or authentication mechanisms of the electronic devices may be temporarily cracked, confidential data may suffer from a high data leakage risk. Traditional laser detectors can be implemented by using a latch circuit. However, the latch circuit of the traditional laser detectors requires a large layout area to place a huge number of detection components for improving a detection probability. Therefore, developing a laser detector with low hardware complexity and high detection accuracy is an important design issue.

SUMMARY OF THE INVENTION

In an embodiment of the present invention, a laser detector is disclosed. The laser detector comprises a delay chain circuit and a warning circuit. The warning circuit is coupled to the delay chain circuit and configured to generate a warning signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
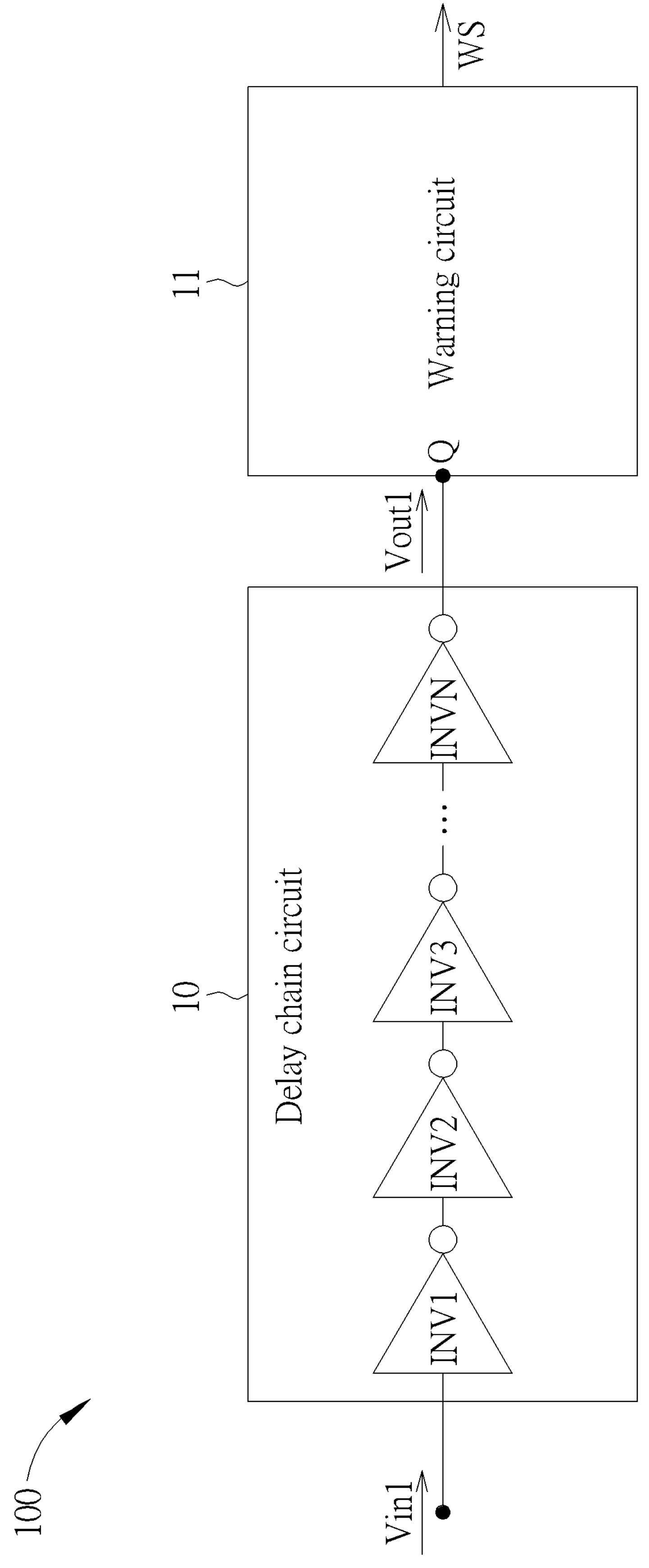
FIG. 1 is a block diagram of a laser detector according to an embodiment of the present invention.
Figure 2:
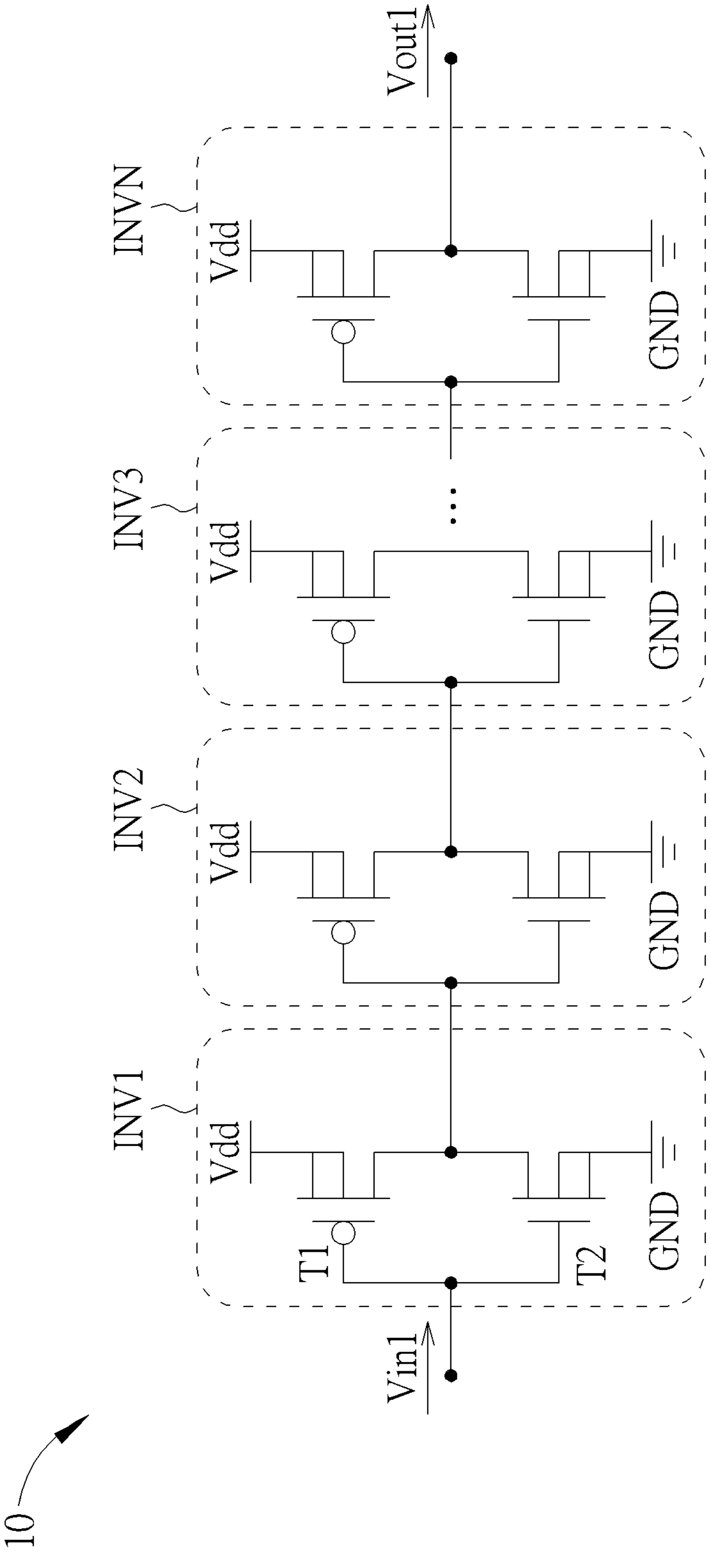
FIG. 2 is a circuit structure of a delay chain circuit of the laser detector in FIG. 1.

FIG. 1 is a block diagram of a laser detector 100 according to an embodiment of the present invention. FIG. 2 is a circuit structure of a delay chain circuit 10 of the laser detector 100. In FIG. 1 and FIG. 2, the laser detector 100 may include a delay chain circuit 10 and a warning circuit 11. The delay chain circuit 10 may include N inverters INV1 to INVN coupled in series, an input terminal, and an output terminal. Each of the N inverters INV1 to INVN may include a first transistor T1 and a second transistor T2. The first transistor T1 includes a first terminal for receiving a working voltage Vdd, a second terminal, and a control terminal. The second transistor T2 includes a first terminal coupled to the second terminal of the first transistor T1, a second terminal coupled to a ground terminal GND, and a control terminal coupled to the control terminal of the first transistor T1. The first transistor T1 is a P-type metal oxide semiconductor field effect transistor (PMOS). The second transistor T2 is an N-Type metal oxide semiconductor field effect transistor (NMOS). The input terminal of the delay chain circuit 10 is used for receiving an input voltage Vin1 to the N inverters INV1 to INVN. The output terminal of the delay chain circuit 10 is used for outputting an output voltage Vout1 generated by the N inverters INV1 to INVN. The warning circuit 11 is coupled to the delay chain circuit 10 for generating a warning signal WS. A terminal Q can be regarded as an input terminal of the warning circuit 11. In other words, the warning circuit 11 can generate the warning signal WS according to a transient voltage fluctuation of the terminal Q.

In the laser detector 100, the number N can be a positive integer. N can be changed according to the input voltage Vin1 and the design of the warning circuit 11. For example, when the input voltage Vin1 is a high voltage corresponding to logic "1", N can be an odd number. In this scenario, under a normal condition, after the input voltage Vin1 passes through the N inverters, the output voltage Vout1 is a low voltage corresponding to logic "0". However, if at least one inverter of the delay chain circuit 10 receives a laser signal, the output voltage Vout1 at the output terminal of the delay chain circuit 10 generates a transient voltage fluctuation. For example, the transient voltage fluctuation temporally disturbs the output voltage Vout1 from the low voltage of logic "0" to a high voltage of logic "1". Therefore, the warning circuit 11 can generate the warning signal WS according to the transient voltage fluctuation. In another embodiment, when the input voltage Vin1 is a low voltage corresponding to logic "0", N can be an even number. In this scenario, under normal condition, after the input voltage Vin1 passes through the N inverters, the output voltage Vout1 is still the low voltage corresponding to logic "0". Similarly, if at least one inverter of the delay chain circuit 10 receives the laser signal, the output voltage Vout1 at the output terminal of the delay chain circuit 10 generates a transient voltage fluctuation. For example, the transient voltage fluctuation temporally disturbs the output voltage Vout1 from the low voltage of logic "0" to a high voltage of logic "1". Therefore, the warning circuit 11 can generate the warning signal WS according to the transient voltage fluctuation. In the laser detector 100, any reasonable design modification of the input voltage Vin1, the output voltage Vout1, or the delay chain circuit 10 falls into the scope of the present invention.

Figure 3:
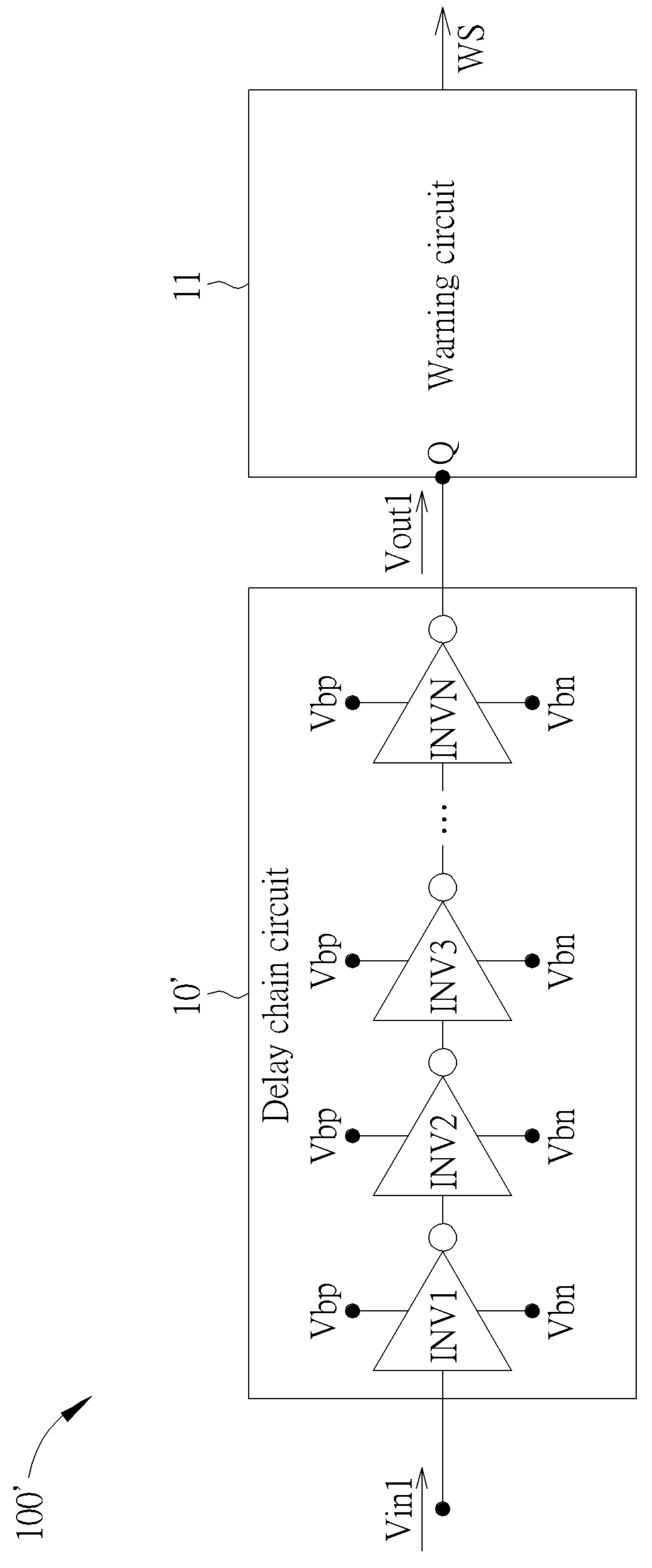
FIG. 3 is an illustration of controlling a detection sensitivity of an inverter by using substrate bias voltages of the laser detector in FIG. 1.
Figure 4:
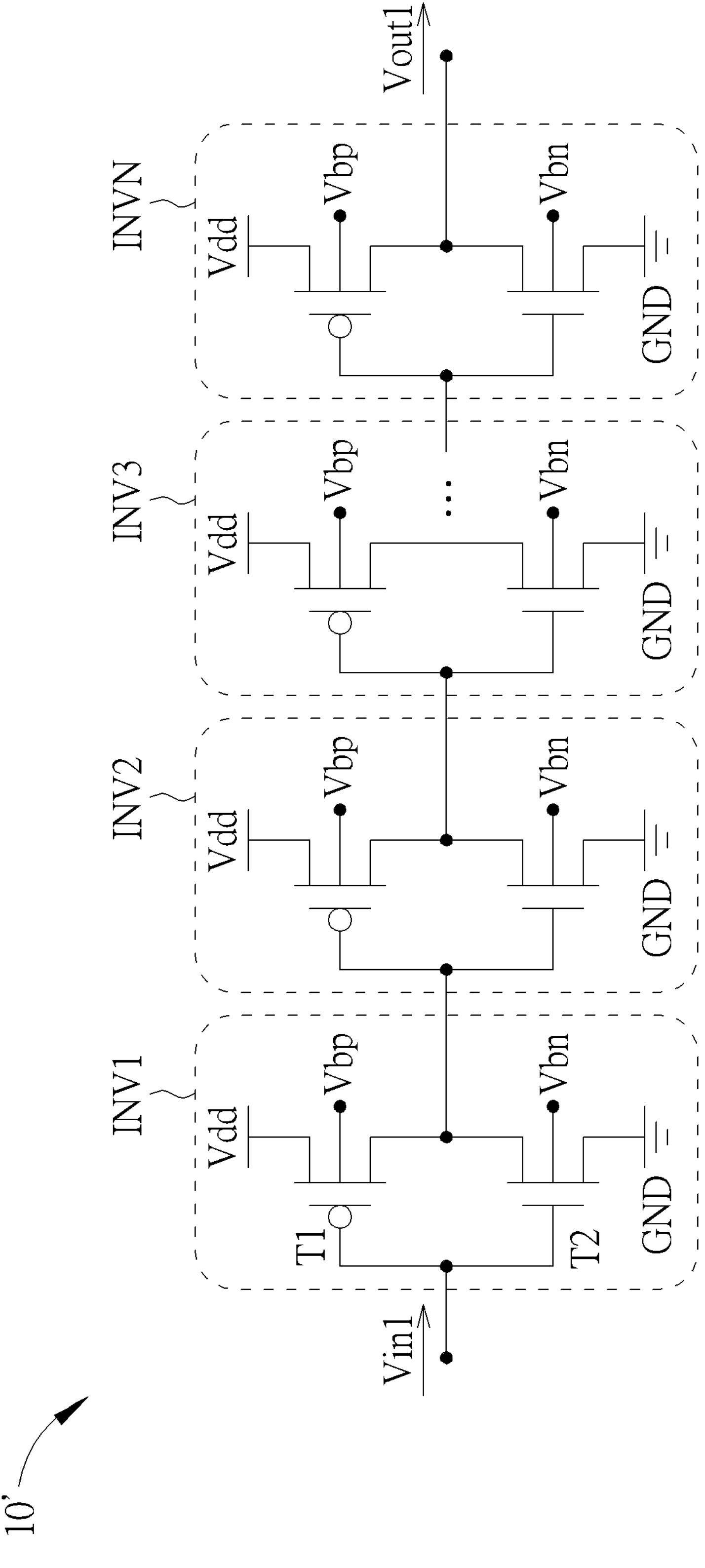
FIG. 4 is a circuit structure of introducing bulk terminals to the delay chain circuit for receiving substrate bias voltages of the laser detector in FIG. 3.

FIG. 3 is an illustration of controlling a detection sensitivity of an inverter by using substrate bias voltages Vbp and Vbn of the laser detector 100. FIG. 4 is a circuit structure of introducing bulk terminals to the delay chain circuit 10' for receiving substrate bias voltages Vbp and Von of the laser detector 100. To avoid ambiguity, in FIG. 3 and FIG. 4, the substrate bias voltage Vbp is called as a first substrate bias voltage Vbp hereafter. The substrate bias voltage Vbn is called as a second substrate bias voltage Vbn hereafter. The laser detector 100 in FIG. 3 is called as a laser detector 100' hereafter. The delay chain circuit in the laser detector 100' is called as the delay chain circuit 10' hereafter. In FIG. 3 and FIG. 4, the first transistor T1 of the delay chain circuit 10' can further include a bulk terminal for receiving the first substrate bias voltage Vbp. The second transistor T2 of the delay chain circuit 10' can further include a bulk terminal for receiving the second substrate bias voltage Vbn. Here, the first substrate bias voltage Vbp can be used for controlling a first threshold voltage and a size of a depletion region of a P-N junction between the first terminal and the second terminal of the first transistor T1. It should be understood that a threshold voltage of a transistor can be defined as: an input voltage corresponding to a midpoint of a turning area in a transmission characteristic curve of the transistor (i.e., such as a correlation curve between the output current Id and the input voltage Vg of the transistor). In other words, since the first substrate bias voltage Vbp can control the first threshold voltage and the size of the depletion region of the P-N junction between the first terminal and the second terminal of the first transistor T1, the first substrate bias voltage Vbp can control conduction characteristics of the first transistor T1 and photocurrent characteristics of the first transistor T1 generated by laser interference. Similarly, the second substrate bias voltage Vbn can be used for controlling a second threshold voltage and a size of a depletion region of a P-N junction between the first terminal and the second terminal of the second transistor T2. Therefore, the second substrate bias voltage Vbn can control the conduction characteristics of the second transistor T2 and the photocurrent characteristics of the second transistor T2 generated by the laser interference. As a result, since the first substrate bias voltage Vbp and the second substrate bias voltage Von can control the conduction characteristics and the photocurrent characteristics of the first transistor T1 and the second transistor T2, they can control a sensitivity of generating the transient voltage fluctuation when the delay chain circuit 10' is interfered by the laser signal. For example, by adjusting the first substrate bias voltage Vbp and the second substrate bias voltage Vbn, the sensitivity of generating the transient voltage fluctuation can be adjusted.

Figure 5:
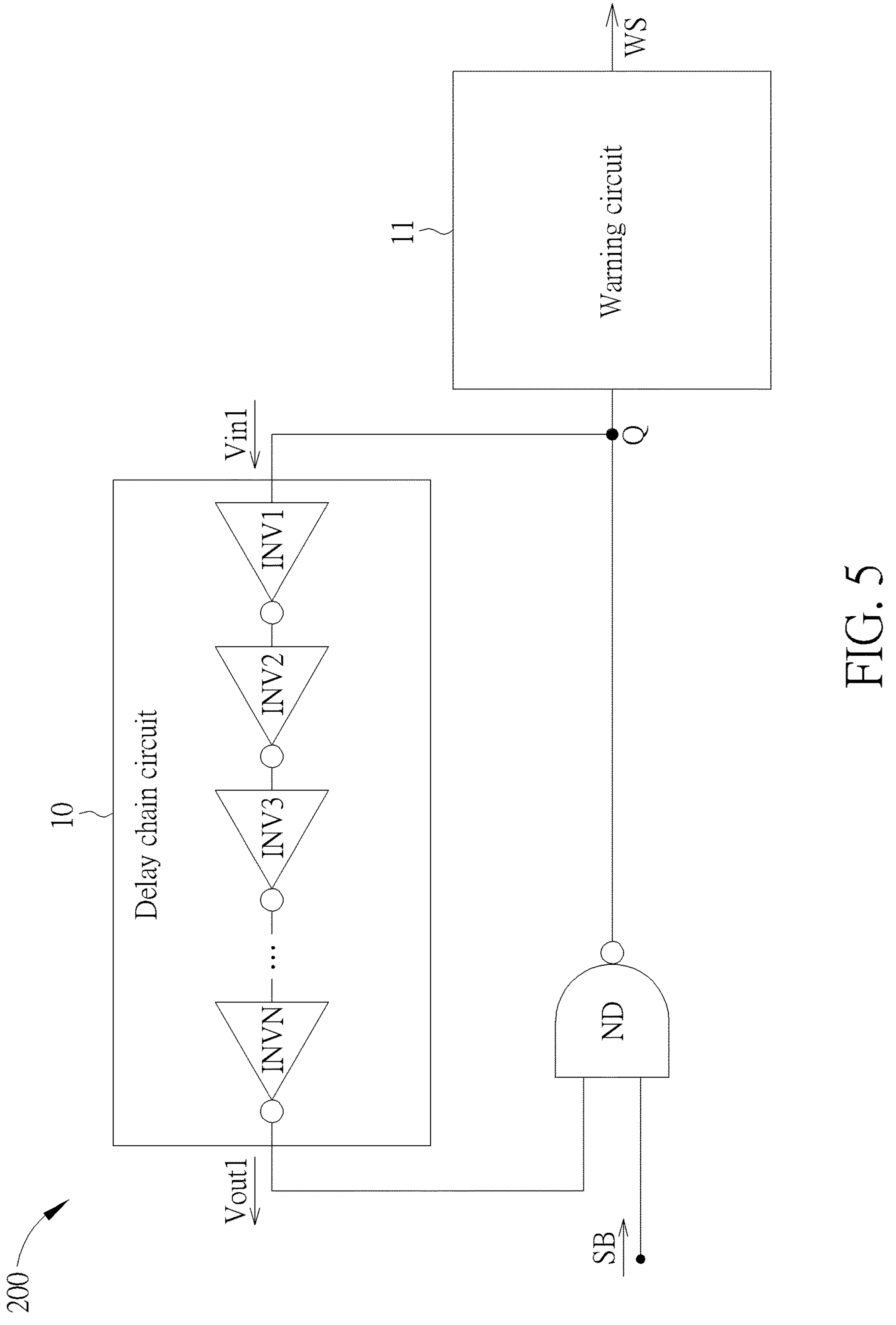
FIG. 5 is a block diagram of introducing a NAND gate for generating a closed-loop latch circuit of the laser detector in FIG. 1.

FIG. 5 is a block diagram of introducing a NAND gate ND for generating a closed-loop latch circuit of the laser detector 100. To avoid ambiguity, the laser detector in FIG. 5 is called as a laser detector 200 hereafter. For improving a stability of detecting the laser signal, the NAND gate ND can be introduced to the laser detector 200 for generating the closed-loop latch circuit. Here, the closed-loop latch circuit is capable of storing information of stable states, as illustrated below. In FIG. 5, the NAND gate ND includes a first input terminal coupled to the output terminal of the delay chain circuit 10, a second input terminal for receiving a reset signal SB, and an output terminal coupled to the input terminal of the delay chain circuit 10. The terminal Q can be regarded as the input terminal of the warning circuit 11. The warning circuit 11 can generate the warning signal WS according to a change of logic states caused by the transient voltage fluctuation of the delay chain circuit 10 at the terminal Q. In FIG. 5, the input voltage Vin1 of the delay chain circuit 10 can be generated from the output terminal of the NAND gate ND. The output voltage Vout1 of the delay chain circuit 10 inputs to the first input terminal of the NAND gate ND. Therefore, in the laser detector 200, the delay chain circuit 10 can be regarded as a feedback chain circuit. The delay chain circuit 10 and the NAND gate ND can form the closed-loop circuit. Operations of the laser detector 200 are illustrated below. For example, it is assumed that the delay chain circuit 10 includes N inverters INV1 to INVN coupled in series. N is an odd number. The reset signal SB is a low voltage corresponding to logic "0" for a short time when the system is turned on. The terminal Q is at a high voltage corresponding to logic "1". Then, the reset signal SB is changed from the low voltage corresponding to logic "0" to a high voltage corresponding to logic "1". At this time, the terminal Q is still at the high voltage corresponding to logic "1". When the output terminal (terminal Q) of the NAND gate ND is at the high voltage, the output voltage Vout1 of the delay chain circuit 10 is at the low voltage corresponding to logic "0". The output voltage Vout1 of the delay chain circuit 10 is received by the first input terminal of the NAND gate ND. Therefore, two input terminals of the NAND gate ND receive voltages corresponding to logic "0" and logic "1" respectively. The output terminal (terminal Q) of the NAND gate ND can generate the high voltage corresponding to logic "1". Under normal condition, aforementioned state of the closed-loop circuit can be stably latched. However, if at least one inverter in the delay chain circuit 10 receives the laser signal, the output voltage Vout1 at the output terminal of the delay chain circuit 10 generates the transient voltage fluctuation. For example, the transient voltage fluctuation temporally disturbs the output voltage Vout1 from the low voltage of logic "0" to a high voltage of logic "1". Therefore, the transient voltage fluctuation is also generated at the output terminal (terminal Q) of the NAND gate ND. At this time, latch states of the closed-loop circuit formed by the delay chain circuit 10 and the NAND gate ND are also changed due to the transient voltage fluctuation. For example, a voltage of the output terminal (terminal Q) of the NAND gate ND is changed from the high voltage corresponding to logic state "1" to the low voltage corresponding to logic state "0". Therefore, the warning circuit 11 can generate the warning signal WS according to the transient voltage fluctuation.

Further, by identifying the logic state of the terminal Q, a location of the chip attacked by the laser signal can be determined.

Figure 6:
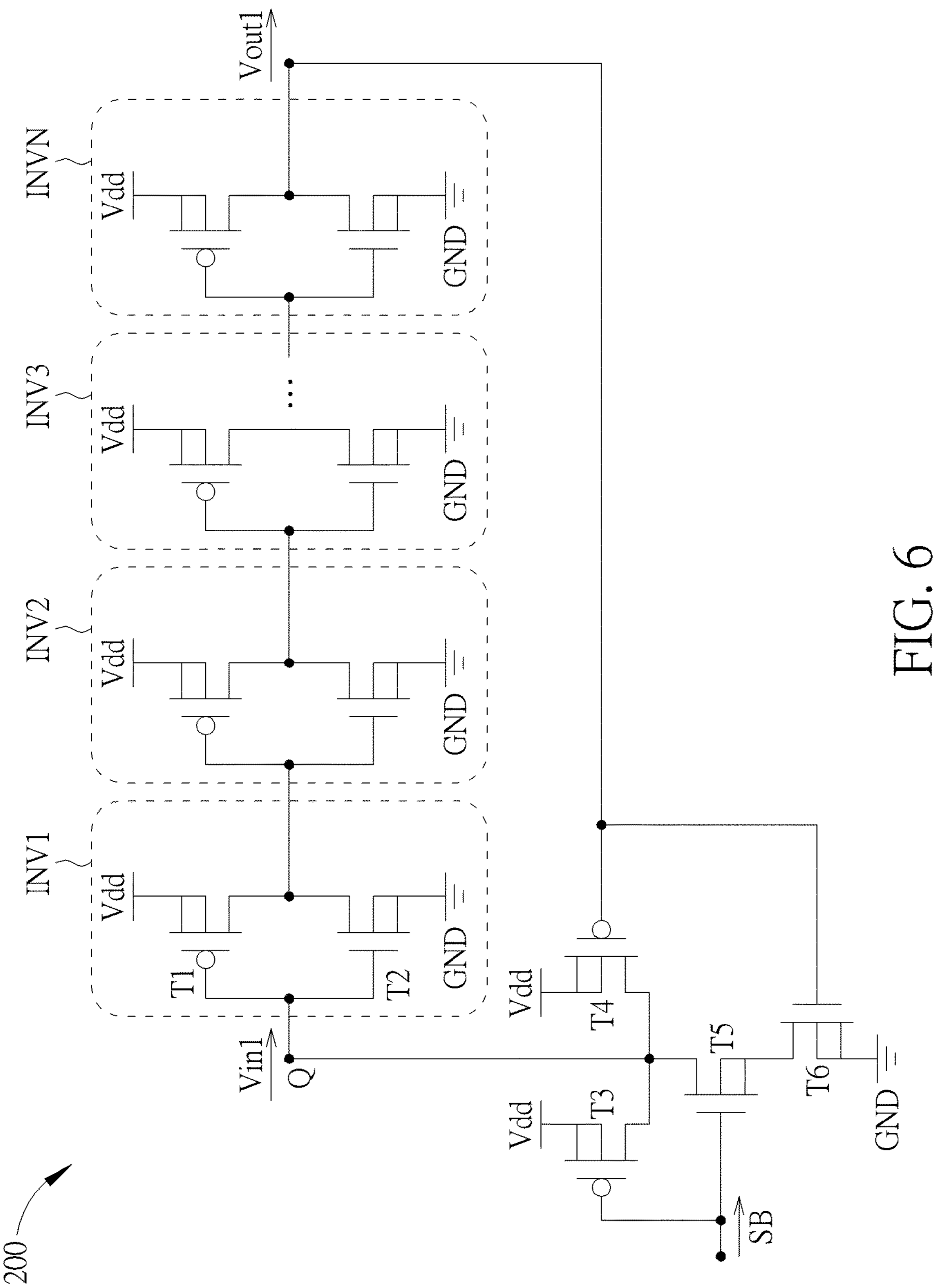
FIG. 6 is circuit structures of the delay chain circuit and the NAND gate of the laser detector in FIG. 5.

FIG. 6 is circuit structures of the delay chain circuit 10 and the NAND gate ND of the laser detector 200. Circuit structures of the delay chain circuits 10 of the laser detector 200 and the laser detector 100 are identical. Therefore, details are omitted here. The NAND gate ND may include a third transistor T3, a fourth transistor T4, a fifth transistor T5, and a sixth transistor T6. The third transistor T3 includes a first terminal for receiving the working voltage Vdd, a second terminal, and a control terminal for receiving the reset signal SB. The fourth transistor T4 includes a first terminal for receiving the working voltage Vdd, a second terminal coupled to the second terminal of the third transistor T3, and a control terminal coupled to the output terminal of the delay chain circuit 10. The fifth transistor T5 includes a first terminal coupled to the input terminal of the delay chain circuit 10, a second terminal, and a control terminal coupled to the control terminal of the third transistor T3. The sixth transistor T6 includes a first terminal coupled to the second terminal of the fifth transistor T5, a second terminal coupled to the ground terminal GND, and a control terminal coupled to the control terminal of the fourth transistor T4. Further, the third transistor T3 and the fourth transistor T4 are two P-type metal oxide semiconductor field effect transistors (PMOS). The fifth transistor T5 and the sixth transistor T6 are two N-type metal oxide semiconductor field effect transistors (NMOS).

Figure 7:
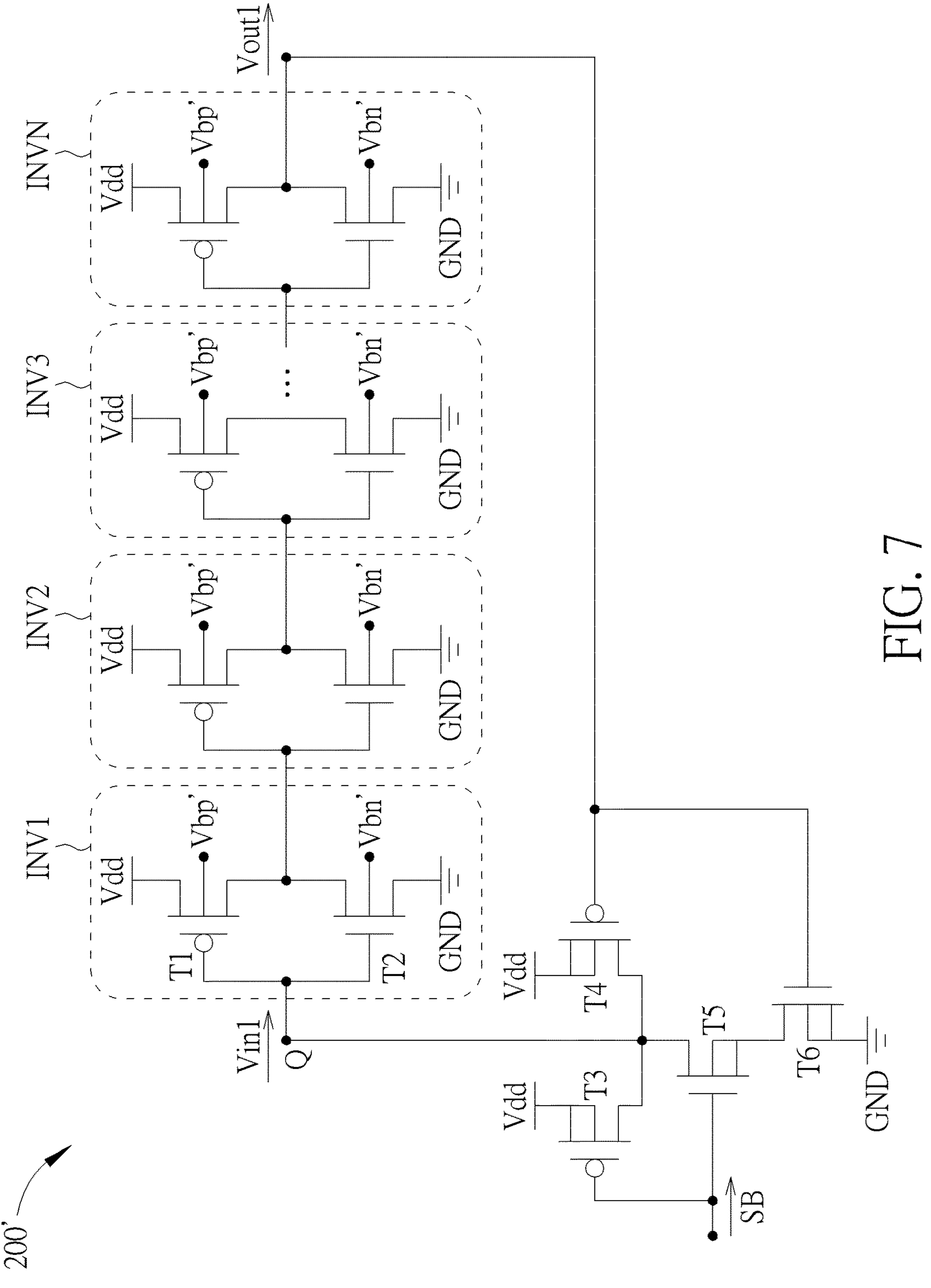
FIG. 7 is a circuit structure of introducing bulk terminals for receiving substrate bias voltages of the laser detector in FIG. 5.

FIG. 7 is a circuit structure of introducing bulk terminals for receiving substrate bias voltages Vbp' and Vbn' of the laser detector 200. To avoid ambiguity, in FIG. 7, the substrate bias voltage Vbp' is called as a third substrate bias voltage Vbp' hereafter. The substrate bias voltage Vbn' is called as a fourth substrate bias voltage Vbn' hereafter. The laser detector 200 in FIG. 7 is called as a laser detector 200' hereafter. In FIG. 7, the first transistor T1 can further include a bulk terminal for receiving the third substrate bias voltage Vbp'. The second transistor T2 can further include a bulk terminal for receiving the fourth substrate bias voltage Vbn'. Similarly, in the laser detector 200', the third substrate bias voltage Vbp' can be used for controlling a third threshold voltage and a size of a depletion region of a P-N junction between the first terminal and the second terminal of the first transistor T1. Therefore, the third substrate bias voltage Vbp' can control the conduction characteristics of the first transistor T1 and the photocurrent characteristics of the first transistor T1 generated by laser interference. The fourth substrate bias voltage Vbn' can be used for controlling a fourth threshold voltage and a size of a depletion region of a P-N junction between the first terminal and the second terminal of the second transistor T2. Therefore, the fourth substrate bias voltage Vbn' can control the conduction characteristics of the second transistor T2 and the photocurrent characteristics of the second transistor T2 generated by laser interference. Similarly, since the third substrate bias voltage Vbp' and the fourth substrate bias voltage Vbn' can control the conduction characteristics and the photocurrent characteristics of the first transistor T1 and the second transistor T2, they can control the sensitivity of generating the transient voltage fluctuation when the laser detector 200' is interfered by the laser signal.

Figure 8:
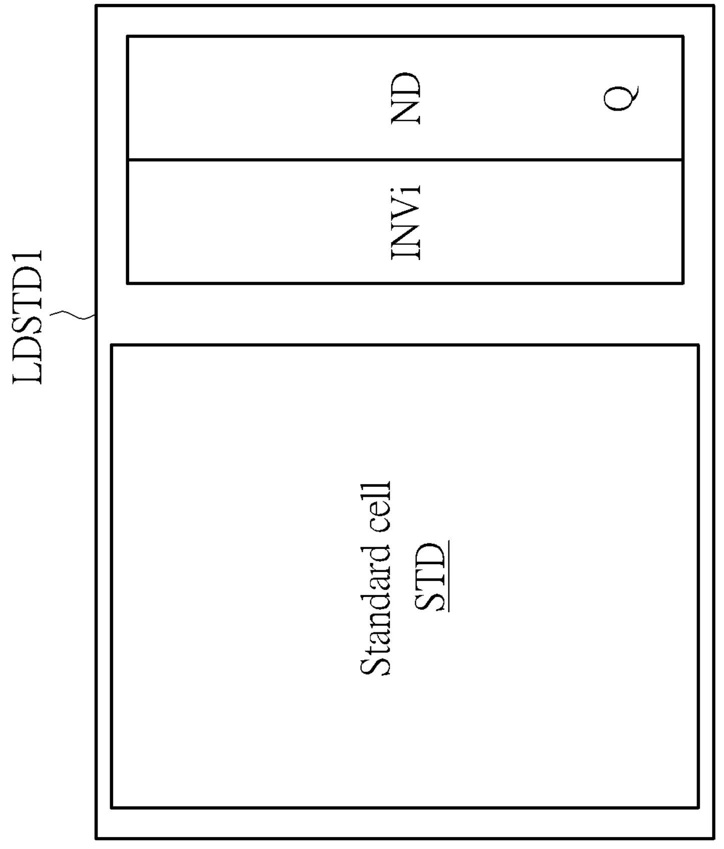
FIG. 8 is an illustration of a first allocation mode of a standard cell and the laser detector in FIG. 5.
Figure 9:
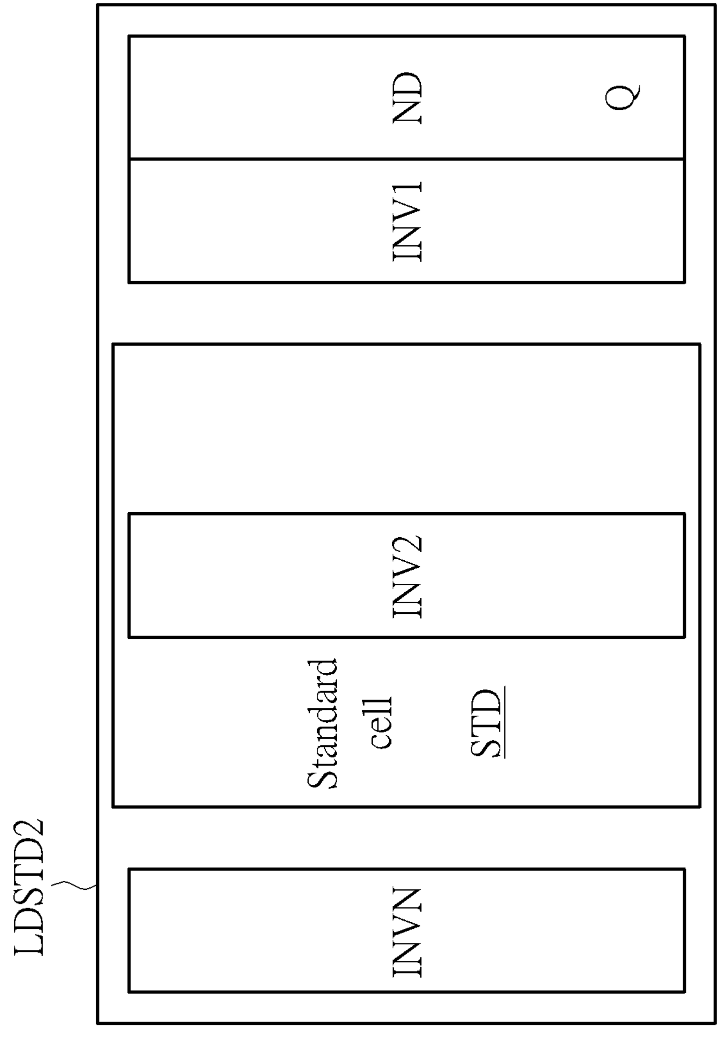
FIG. 9 is an illustration of a second allocation mode of the standard cell and the laser detector in FIG. 5.
Figure 10:
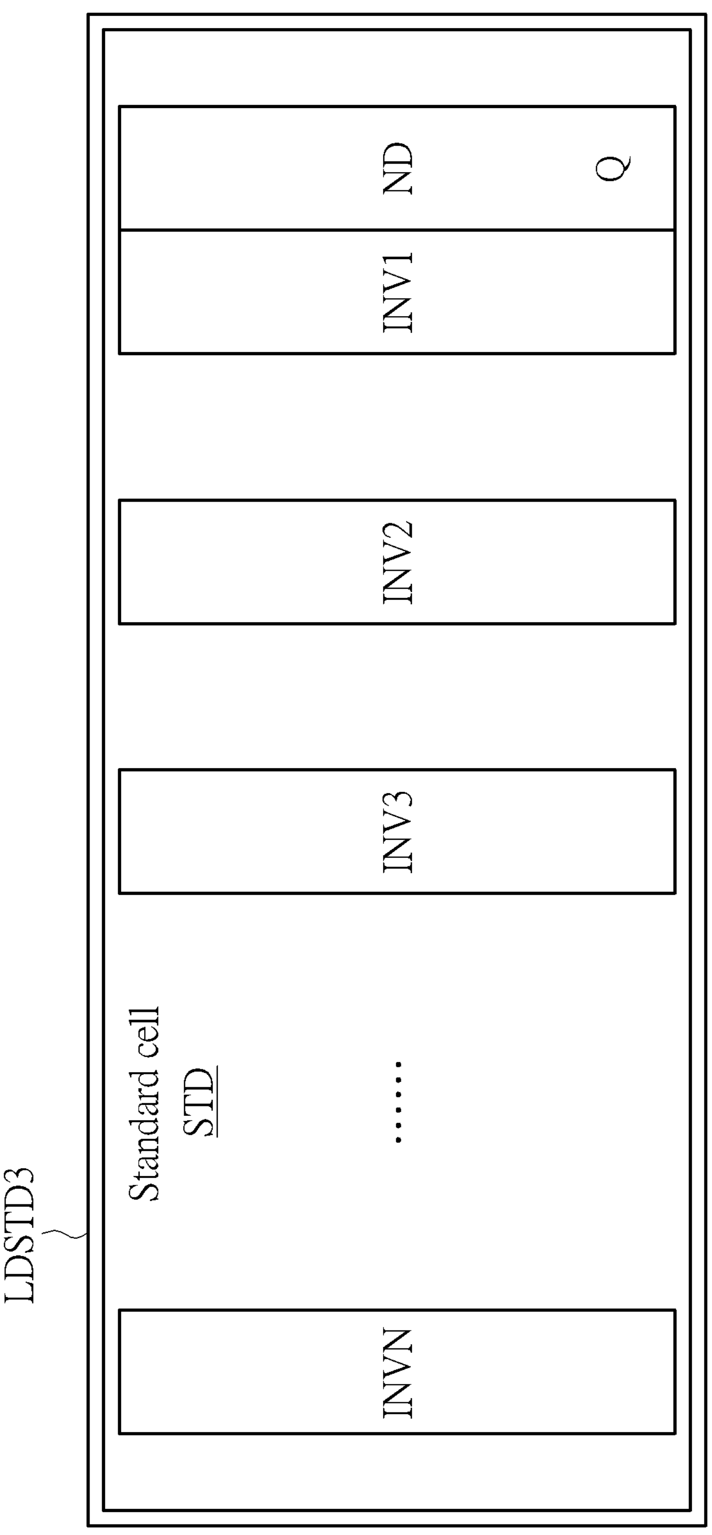
FIG. 10 is an illustration of a third allocation mode of the standard cell and the laser detector in FIG. 5.

FIG. 8 is an illustration of a first allocation mode of a standard cell STD and the laser detector 200. FIG. 9 is an illustration of a second allocation mode of the standard cell STD and the laser detector 200. FIG. 10 is an illustration of a third allocation mode of the standard cell STD and the laser detector 200. It should be understood that the allocation modes of the laser detector 200 and the standard unit STD in FIG. 8, FIG. 9, and FIG. 10 can be different. However, the laser detectors 100, 100', and 200' can also be applied to the allocation modes in FIG. 8, FIG. 9, and FIG. 10. Further, the present invention is not limited to specific allocation modes in FIG. 8, FIG. 9, and FIG. 10. In FIG. 8, at least one of the N inverters (INVi) of the delay chain circuit can be disposed outside the standard cell, and on at least one side of the standard cell. For example, at least one inverter INVi or all inverters can be disposed on a right side or a left side of the standard unit STD. Further, the NAND gate ND can also be disposed on the right side or the left side of the standard unit STD. The terminal Q can be regarded as the output terminal of the NAND gate ND. In FIG. 8, the laser detector 200 and the standard cell STD can be integrated into a first laser detector standard cell LDSTD1. The first laser detector standard cell LDSTD1 can be used for detecting if an outside region of the standard unit STD is interfered by the laser signal. In FIG. 9, the N inverters of the delay chain circuit can be partially disposed outside the standard cell STD, and partially embedded within the standard cell STD. For example, at least one inverter (i.e., such as an inverter INV2) of the laser detector 200 can be embedded within the standard cell STD. The remaining inverters can be disposed outside the standard cell STD. The terminal Q can be regarded as the output terminal of the NAND gate ND. In FIG. 9, the laser detector 200 and the standard unit STD can be integrated into a second laser detector standard cell LDSTD2. The second laser detector standard cell LDSTD2 can be used for detecting if an outside region or an inside region of the standard unit STD is interfered by the laser signal. In FIG. 10, the N inverters of the delay chain circuit can be embedded within the standard cell STD. For example, all inverters INV1 to INVN of the laser detector 200 can be embedded in the standard cell STD. The terminal Q is regarded as the output terminal of the NAND gate ND. In FIG. 10, the laser detector 200 and the standard unit STD can be integrated into a third laser detector standard cell LDSTD3. The third laser detector standard cell LDSTD3 can be used for detecting if an inside region of the standard cell STD is interfered by the laser signal.

Figure 11:
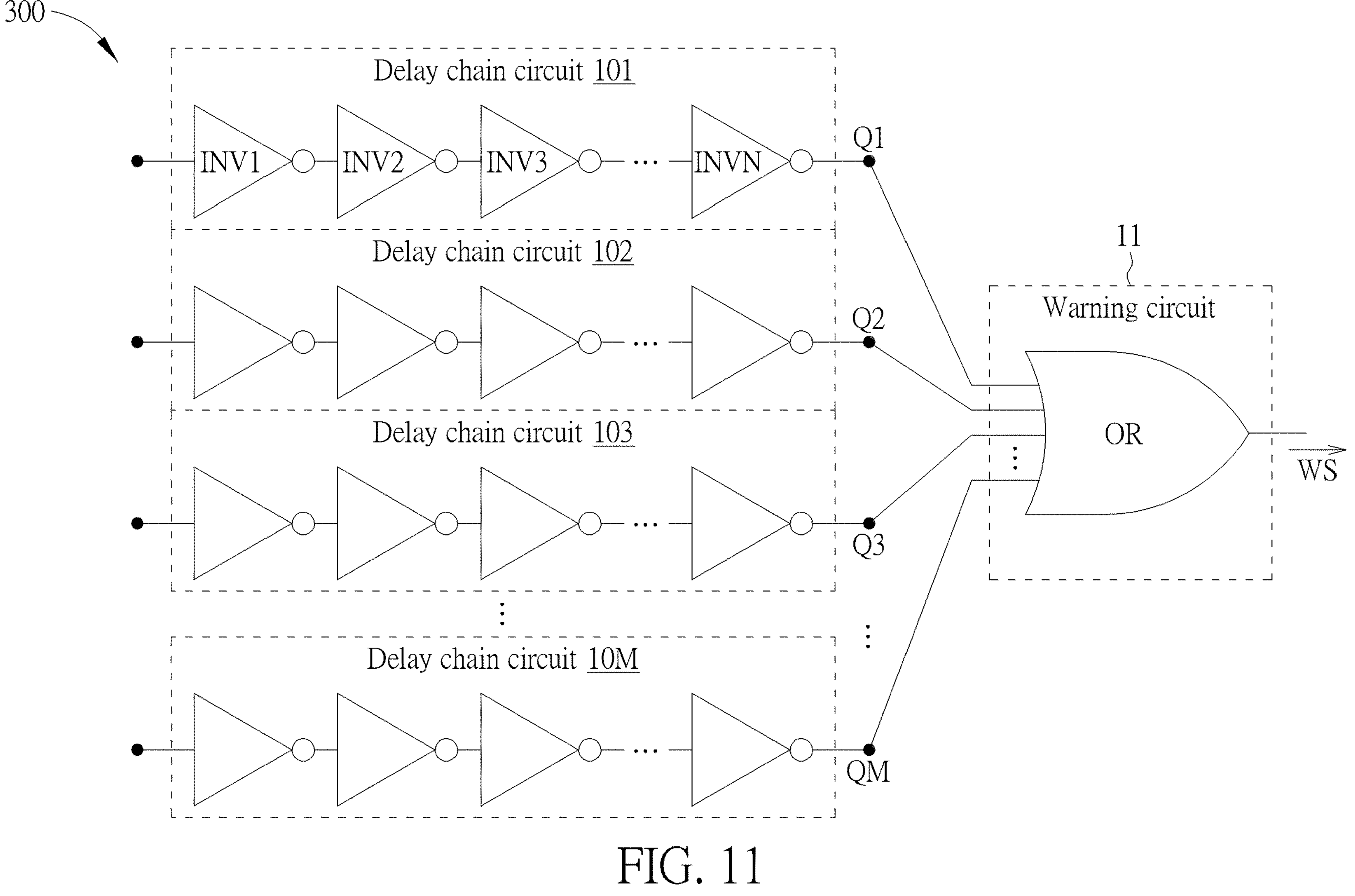
FIG. 11 is a block diagram of detecting laser signals of a plurality of regions by an OR gate after the laser detector in FIG. 1 introduces at least one delay chain circuit.

FIG. 11 is a block diagram of detecting laser signals of a plurality of regions by an OR gate OR after the laser detector 100 introduces at least one delay chain circuit. As shown in FIG. 11, the laser detector 100 can further include at least one delay chain circuit for detecting if a plurality of regions are attacked by the laser signal. To avoid ambiguity, the laser detector in FIG. 11 is called as a laser detector 300 hereafter. The laser detector 300 includes a plurality of delay chain circuits 101 to 10M and the warning circuit 11. The plurality of delay chain circuits 101 to 10M are coupled to the warning circuit 11. It should be understood that at least one or all of the plurality of delay chain circuits 101 to 10M can be replaced with the closed-loop latch circuit in FIG. 5. Further, the laser detector 300 can also use the substrate bias voltages for controlling sensitivities of detecting laser signals in different regions. In other words, circuits for detecting the laser signals corresponding to terminal Q1 to terminal QM may be different. Their sensitivities for detecting laser signals may also be different. Any reasonable technology or hardware modification falls into the scope of the present invention. The warning circuit 11 may include an OR gate. The warning circuit 11 can generate the warning signal WS according to the transient voltage fluctuation generated from the terminal Q1 to the terminal QM. For example, under normal condition, the terminal Q1 to the terminal QM are at low voltages corresponding to logic "0". When the warning circuit 11 includes the OR gate, the output of the OR gate is at a low voltage of logic corresponding to logic "0". However, if the transient voltage fluctuation is generated from at least one of the terminal Q1 to QM (i.e., for example, from a low voltage corresponding to logic "0" to a high voltage corresponding to logic "1"), an output terminal of the OR gate is at a high voltage corresponding to logic "1". Therefore, the warning circuit 11 can generate the warning signal WS accordingly. In other words, in the laser detector 300, each terminal corresponds to a region. When at least one region is interfered by the laser signal, the warning circuit 11 generates the warning signal WS.

It should be understood that the warning circuit 11 can be reasonably modified. For example, the warning circuit 11 can partition the terminals Q1 to QM into some groups. Then, the warning circuit 11 can introduce a plurality of OR gates. Each OR gate is used for detecting the transient voltage fluctuation at terminals of a corresponding group, denoted as a group-based OR gate. Then, an OR gate of the next stage can be used for integrating all group-based OR gates and outputting the warning signal WS. By using such a design, dimensions of the OR gates can be reduced. Any reasonable technology or hardware modification falls into the scope of the present invention.

Figure 12:
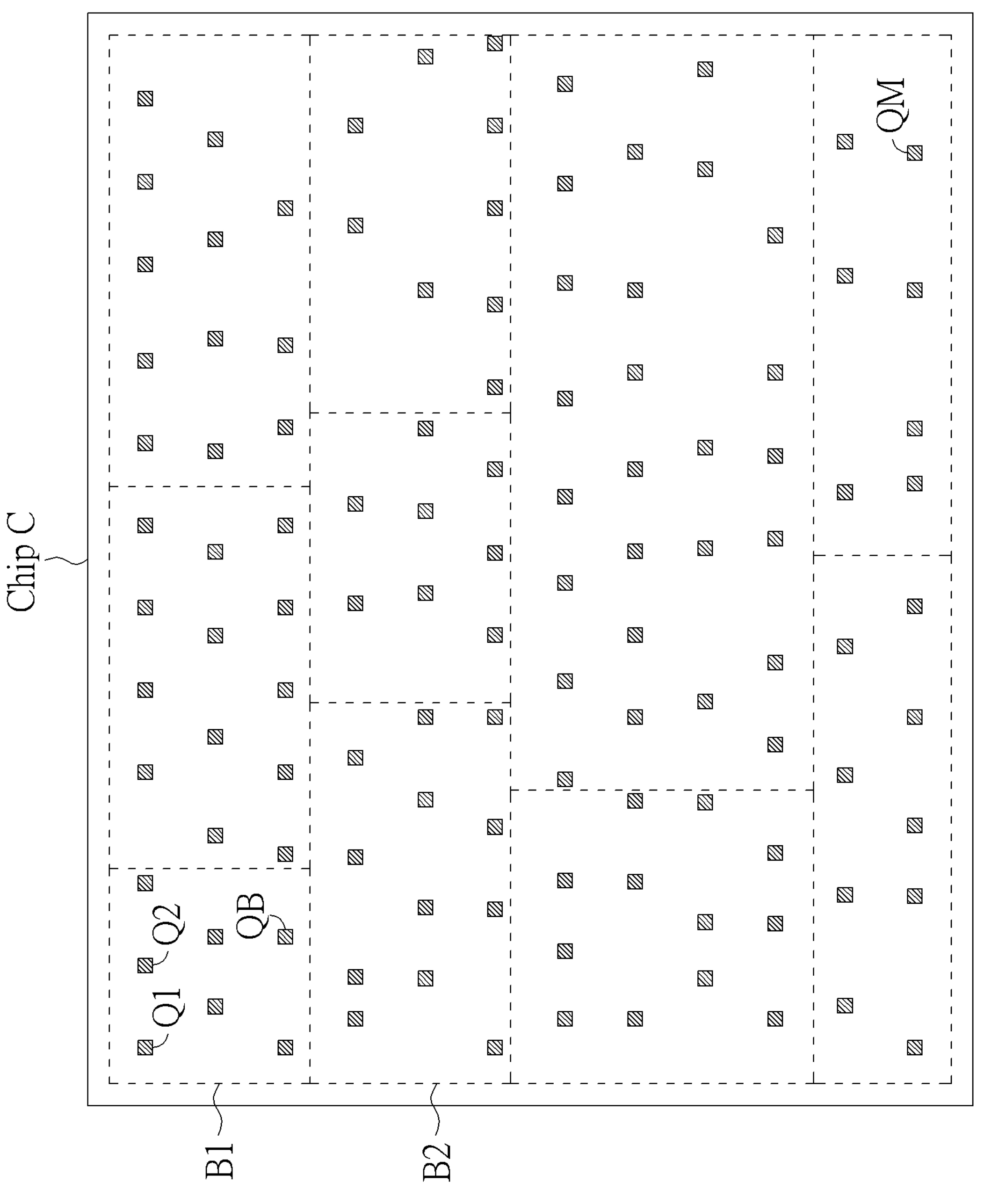
FIG. 12 is an illustration of detecting laser signals of a plurality of blocks on a chip when the delay chain circuits of the laser detector in FIG. 11 are distributed within the plurality of blocks on the chip.

FIG. 12 is an illustration of detecting laser signals of a plurality of blocks on a chip C when the delay chain circuits of the laser detector 300 are distributed within the plurality of blocks on the chip C. As previously mentioned, the laser detector 300 can detect if at least one region is interfered by the laser signal. Therefore, the laser detector 300 can be applied to the chip C for detecting if at least one block of the chip C is interfered by the laser signal. In FIG. 12, the chip C may include a plurality of blocks, such as a block B1, a block B2, and so on. A plurality of terminals Q1 to QM of the laser detector 300 may be distributed within the plurality of blocks on the chip C. Each terminal corresponds to a delay chain circuit. For example, the block B1 may include terminals Q1 to QB. An OR gate corresponding to block B1 can be coupled to terminals Q1 to QB. Therefore, when the transient voltage fluctuation is detected from at least one terminal of the terminals Q1 to QB, the warning circuit 11 can generate the warning signal WS. Similarly, all blocks of the chip C can use a similar mechanism for detecting if they are interfered by the laser signal. Alternatively, as shown in FIG. 11, all terminals Q1 to QM may be coupled to one OR gate. By using such a design, if the transient voltage fluctuation is detected from at least one of the terminals Q1 to QM, the warning circuit 11 can generate the warning signal WS. In other words, the laser detector 300 can generate the warning signal WS when any block of the chip C is interfered by the laser signal.

To sum up, the present invention illustrates a laser detector. The laser detector can use an open-loop delay chain circuit or a closed-loop latch circuit for detecting interference caused by the laser signal. The delay chain circuit can include a plurality of inverters coupled in series. The plurality of inverters can be used for enhancing an effect of the transient voltage fluctuation, thereby increasing a probability of successfully detecting the laser signal. The latch circuit may include a plurality of inverters and a NAND gate. Since the latch circuit can store information of stable states, it can resist environmental interference. Therefore, the robustness of detecting the laser signal can be increased. As a result, the laser detector of the present invention can be applied to any electronic component or chip. When any region of the electronic component or chip is interfered by the laser signal, the laser detector can generate the warning signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A laser detector comprising:
- a delay chain circuit, comprising:
  - N inverters coupled in series;
  - an input terminal configured to receive an input voltage to the N inverters; and
  - an output terminal configured to output an output voltage generated by the N inverters;
- a NAND gate comprising:
  - a first input terminal coupled to the output terminal of the delay chain circuit;
  - a second input terminal configured to receive a reset signal; and
  - an output terminal coupled to the input terminal of the delay chain circuit; and
- a warning circuit coupled to the output terminal of the NAND gate and configured to generate a warning signal;

wherein N is a positive integer.

2. The laser detector of claim 1, wherein after the input terminal of the delay chain circuit receives the input voltage, if at least one inverter of the N inverters of the delay chain circuit receives a laser signal, the output voltage at the output terminal of the delay chain circuit generates a transient voltage fluctuation, and the warning circuit generates the warning signal according to the transient voltage fluctuation.

3. The laser detector of claim 1, wherein if at least one inverter of the N inverters of the delay chain circuit receives a laser signal, a transient voltage fluctuation is generated at the output terminal of the NAND gate, and the warning circuit generates the warning signal according to the transient voltage fluctuation.

4. The laser detector of claim 1, wherein the NAND gate further comprises:
- a third transistor comprising:
  - a first terminal configured to receive a working voltage;
  - a second terminal; and
  - a control terminal configured to receive the reset signal;
- a fourth transistor comprising:
  - a first terminal configured to receive the working voltage;
  - a second terminal coupled to the second terminal of the third transistor; and
  - a control terminal coupled to the output terminal of the delay chain circuit;
- a fifth transistor comprising:
  - a first terminal coupled to the input terminal of the delay chain circuit;
  - a second terminal; and
  - a control terminal coupled to the control terminal of the third transistor; and
- a sixth transistor comprising:
  - a first terminal coupled to the second terminal of the fifth transistor;
  - a second terminal coupled to the ground terminal; and
  - a control terminal coupled to the control terminal of the fourth transistor.

5. The laser detector of claim 4, wherein the third transistor and the fourth transistor are two P-type metal oxide semiconductor field effect transistors, and the fifth transistor and the sixth transistor are two N-type metal oxide semiconductor field effect transistors.

6. The laser detector of claim 4, wherein each inverter of the N inverters comprises:

a first transistor comprising:

a first terminal configured to receive the working voltage;

a second terminal; and a control terminal; and a second transistor comprising:

a first terminal coupled to the second terminal of the first transistor;

a second terminal coupled to a ground terminal; and a control terminal coupled to the control terminal of the first transistor.

7. The laser detector of claim 6, wherein the first transistor of the each inverter further comprises a bulk terminal configured to receive a third substrate bias voltage, and the second transistor of the each inverter further comprises a bulk terminal configured to receive a fourth substrate bias voltage.

8. The laser detector of claim 7, wherein the third substrate bias voltage is used for controlling a third threshold voltage of the first transistor, and the fourth substrate bias voltage is used for controlling a fourth threshold voltage of the second transistor.

9. The laser detector of claim 1, wherein the N inverters of the delay chain circuit are disposed outside a standard cell, and on at least one side of the standard cell.

10. The laser detector of claim 1, wherein the N inverters of the delay chain circuit are partially disposed outside a standard cell, and partially embedded within the standard cell.

11. The laser detector of claim 1, wherein the N inverters of the delay chain circuit are embedded within a standard cell.

12. The laser detector of claim 1, further comprising:

at least one delay chain circuit coupled to the warning circuit.

13. The laser detector of claim 12, wherein the warning circuit comprises an OR gate.

14. The laser detector of claim 13, wherein a plurality of terminals corresponding to all delay chain circuits are distributed within at least one block of a chip.

15. The laser detector of claim 1, wherein each inverter of the N inverters comprises:

a first transistor comprising:

a first terminal configured to receive a working voltage;

a second terminal; and a control terminal; and a second transistor comprising:

a first terminal coupled to the second terminal of the first transistor;

a second terminal coupled to a ground terminal; and a control terminal coupled to the control terminal of the first transistor.

16. The laser detector of claim 15, wherein the first transistor is a P-type metal oxide semiconductor field effect transistor, and the second transistor is an N-type metal oxide semiconductor field effect transistor.

17. The laser detector of claim 16, wherein the first transistor of the each inverter further comprises a bulk terminal configured to receive a first substrate bias voltage, and the second transistor of the each inverter further comprises a bulk terminal configured to receive a second substrate bias voltage.

18. The laser detector of claim 17, wherein the first substrate bias voltage is used for controlling a first threshold voltage of the first transistor, and the second substrate bias voltage is used for controlling a second threshold voltage of the second transistor.

* * * * *